UNITED STATES PATENT OFFICE.

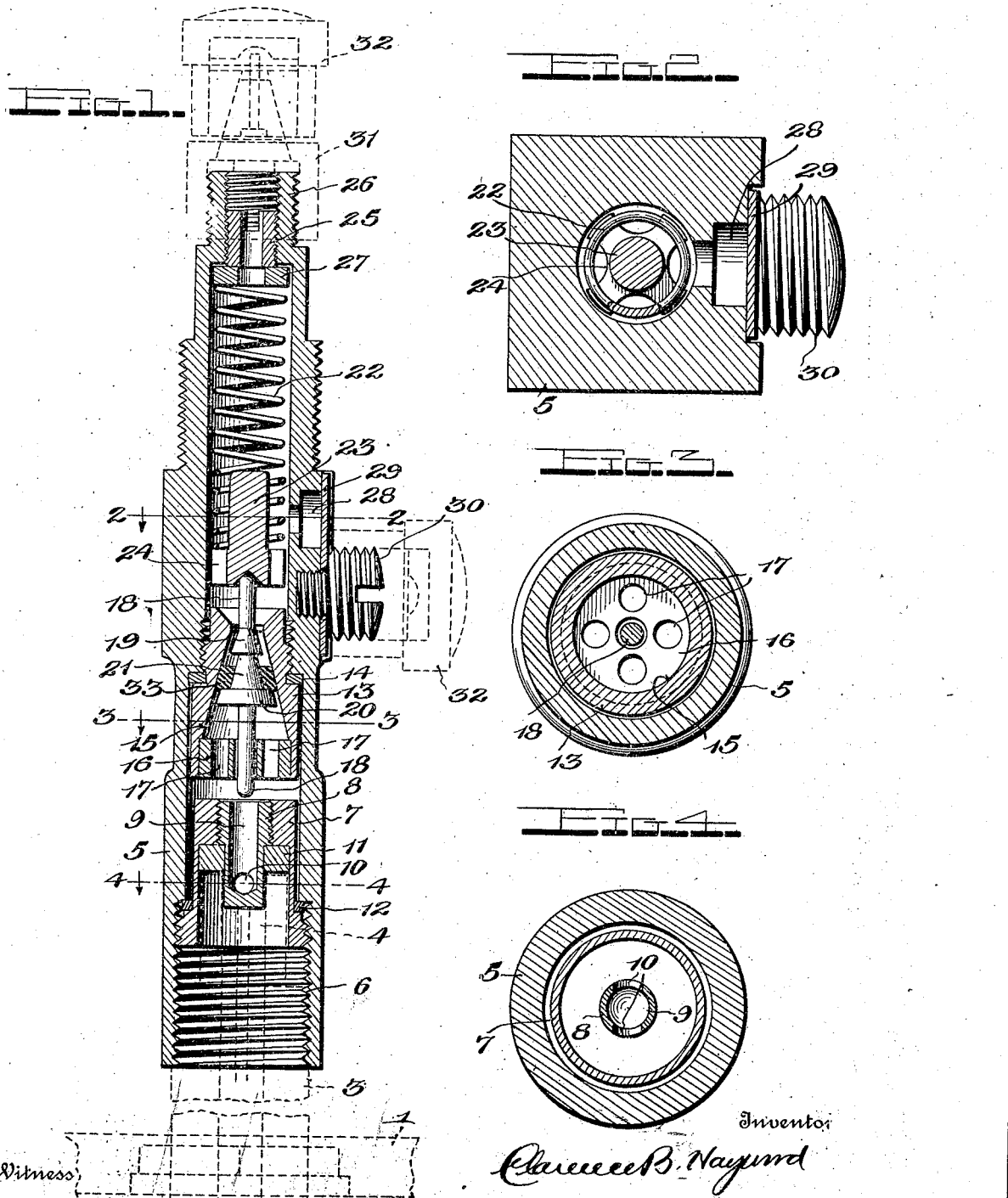

CLARENCE B. HAYWARD, OF NEW HAVEN, CONNECTICUT.

INDICATING-VALVE.

1,258,114. Specification of Letters Patent. Patented Mar. 5, 1918.

Application filed May 25, 1916. Serial No. 99,862.

*To all whom it may concern:*

Be it known that I, CLARENCE B. HAYWARD, a citizen of the United States, residing at New Haven, in the county of New Haven and State of Connecticut, have invented certain new and useful Improvements in Indicating-Valves, of which the following is a specification, reference being had therein to the accompanying drawings.

My invention relates to a new and improved indicator valve, referring more particularly to air valves having means connected therewith for disclosing a sub-normal pressure, and has for its object, among other things, to provide a simple device that will operate automatically to sound an alarm or by other means disclose the fact that air pressure within the valve has been reduced to a point below a predetermined pressure.

To these, and other ends, my invention consists in the air valve, having certain details of construction and combinations of parts, as will be hereinafter described, and more particularly pointed out in the claims.

Referring to the drawings, in which like numerals of reference designate like parts in the several figures;

Figure 1 is a longitudinal sectional view of my improved valve; and

Figs. 2, 3 and 4 are enlarged sectional views thereof, taken upon lines 2—2, 3—3 and 4—4, respectively of Fig. 1.

My invention may be used in connection with any device having air therein under pressure and is especially adapted to be used in connection with vehicle tires, and in the specification and drawings it is described and shown as applied thereto. I would have it understood, however, that while it is so described and illustrated, I do not desire to be limited to such use.

The inner tube of a vehicle tire is usually inflated with air up to a maximum predetermined pressure, and if there is a leakage, this pressure will of course be gradually reduced until the air is fully exhausted and the tire is flat. If this condition of the tire is not discovered promptly and the vehicle is running, the tire is seriously injured. This damage can be prevented if an alarm is given whenever the air pressure becomes reduced to a material extent, say 50% of its maximum pressure, so that the tire may again be inflated. A pressure of 50% of the maximum is merely suggested as a desirable minimum pressure, because the tire can run a considerable distance under this pressure without injury thereto, sufficient in any case to run the vehicle to a garage or station having an air pump.

My device is designed to accomplish the desirable results just above indicated, mechanism being provided that prevents the escape of air when the pressure is above a predetermined minimum, but when it becomes reduced below such minimum, air will escape and contact with a vibratory member, which will create a whistling sound that will announce the fact that the air in the tire has been leaking and the tire requires inflation.

In the drawings I have illustrated by the broken lines a portion of a vehicle tire 1, a portion of an inner tube 2, and connected therewith is the usual valve body 3, within which is mounted a valve 4. All of these parts are old and in common use and constitute no part of my present invention, but as they are generally found in connection with all vehicle tires, I have shown them here for purposes of illustrating the application of my invention.

The numeral 5 designates the outer casing of my device, having the interior threads 6 at one end, by which the valve casing is threaded onto the valve body 3. Threadably mounted in said casing by means of the interior threads 6, is a stem block 7, within which is threaded the stem 8, having an aperture 9 extending part way therethrough, the lower end of which terminates adjacent to a port 10 at right angles to said aperture. The outer casing 5 is threaded onto the valve body 3 in such manner that the end of the stem 8 abuts against the valve 4 and holds the same in its open position so as to permit air to pass into and out of the aperture 9 through the port 10. A gasket 11 surrounds the stem 8 so as to provide an air tight joint at the end of the valve body 3 and a similar gasket 12 is provided around the stem block 7 to prevent leakage of air therethrough. Threadably mounted within the outer casing 5 is the inner valve casing 13 which is surrounded by the usual gasket 14 to prevent leakage of air thereby and which is provided with an interior conical bore 15, which is closed at one end by a disk 16 having a plurality of ports 17 therethrough. Slidable within said la___ ___ casing is the valve stem 18 whi___ gu at one end by the disk 16 and p___ ___ tween its ends with two conical heads 19 and 20, between which is a tapered portion 21, and mounted therein is a valve disk 33, preferably made of yielding material, such as rubber or leather. This valve disk 33 is of less width than the open space between the two heads 19 and 20 and is placed in position by being forced over the head 19. The valve stem 18 has a movement parallel with its axis, and when moved toward the stem block 7 the valve disk 33 contracts by reason of the smaller diameter of that portion of the stem that lies within the bore thereof. By reason of this contraction the frictional hold of the valve disk upon the walls of the conical bore 15 is reduced to such an extent that when the face of the head 19 contacts with the valve disk it can be moved parallel with the axis of said stem with little or no pressure. The reverse movement of the valve stem produces a reverse result, that is, the valve disk moves parallel with the axis of the valve stem until its periphery contacts with the conical bore 15 when the further movement of the stem causes the same to expand and tighten its grip upon said conical bore to such an extent as to prevent the passage of air therethrough. In brief, when opening the valve, the valve disk first contracts and releases its hold and then moves parallel with the valve stem a limited distance until disengaged entirely from said conical bore and in closing the valve the valve disk first moves parallel with the valve stem and then expands.

The means for moving said valve stem in one direction comprises a spring 22 mounted within the casing 5, abutting at one end against the head member 23, which is provided with a plurality of openings 24 around its periphery, a sleeve 25 threaded in the shank 26 of said casing 5, and a washer 27 that lies between said spring and said sleeve. By adjustment of said sleeve within said shank, means are provided whereby the tension of said spring upon said head member and valve stem may be varied to suit differing conditions and accommodate varying pressures.

Through one side of the valve casing 5 is a port 28, normally covered by a vibrator 29 which is secured in position by a screw 30.

I have shown in Fig. 1, by dotted lines, the valve that is usually attached to the valve body 3, and have designated the same by the numeral 31, which valve is provided with a cap 32 that is removed whenever it is desired to inflate the inner tube.

For convenience I have provided a thread upon the head of the screw 30 so that this cap 32, when so removed, may be screwed thereon and engage the vibrator 29 to hold it against the outer casing with such pressure as to entirely close the port 28 and prevent the leakage of air therethrough, and also to provide a convenient means to place said cap and thereby prevent its loss or injury.

In operation my device is attached to the inner tube as above described and the cap 32 removed, threaded upon the head of the screw 30 and against the vibrator 29, thus closing said port. Air is now admitted into said valve casing through the valve 31, as is common practice, which passes through said outer valve casing 5 into the aperture 9 through the port 10, valve body 3 and into the tube 2, and when the same has become fully inflated the air supply is shut off. The pressure therein now moves the valve stem 18 away from the stem block 7 and the conical bore 15 within the inner valve casing 13 is closed by the valve disk 33 in the manner heretofore described. The cap 32 is removed from the screw 30 and again attached to the valve 31, closing the same and releasing the vibrator 29. If air pressure within the inner tube 2 becomes reduced, as above indicated, to a predetermined minimum pressure, the spring 22, which has been adjusted for such minimum pressure, moves the valve disk 33, as above described, thus opening the valve and permitting air to pass through the conical bore 15 and through the port 28 against the vibrator 29, which sounds the alarm.

Other devices may be substituted for announcing such sub-normal air pressure, such as a whistle or any one of numerous devices that will readily suggest themselves to one skilled in the art.

Within the spirit and scope of my invention minor changes and alterations may be made in the details set forth herein and shown in the drawings, and I would therefore have it understood that I do not limit myself to the exact construction herein shown and described, but claim all that falls fairly within the scope of the appended claims.

Having described my invention, what I claim as new and desire to secure by Letters Patent, is:—

1. In a valve, a casing having an elastic valve element movably mounted therein, and means for bodily moving said valve element to open and close the valve, and such means including a valve stem having a cone portion supporting said valve element between stops on said valve stem and permitting independent movement of said valve stem relatively to said valve element.

2. In a valve, the combination with a casing, of a valve element movably mounted therein, a stem within said element movable independently of said element, and means on said stem for first limiting the movement thereof relatively to said element and subsequently effecting the movement of said stem and valve element as one unit.

3. In a valve; a conical seat; a valve carrier or stem having two heads with an intervening cone portion; and a flexible valve disk movably supported on said cone portion, the thickness of said valve disk being relatively less than the length of the space between said heads whereby independent limited movement of said valve disk on its support is permitted.

4. In a valve; a casing having a conical bore; a flexible valve disk mounted therein and capable of independent movement relatively to its support; and a valve stem having a cone shaped portion of greater length than the thickness of said valve disk between two heads and providing a support for said valve disk.

5. In a valve; a conical valve seating; a valve carrier; a flexible valve disk supported on a cone portion of said carrier and capable of independent movement thereon; and means, provided on said carrier to limit said independent movement.

6. In a valve which is automatically opened when the equilibrium of pressure is disturbed; a valve body; a conical valve seating; a valve stem having the valve proper consisting of a flexible disk movably mounted on said stem; and means on said stem for limiting independent movement of said disk relatively to the valve stem.

7. In a valve, a valve body having a valve seating, a valve disk movably mounted on its support in said seating, means for operatively moving said valve disk bodily, consisting of a valve stem having independent movement relatively to said disk, and stops on said valve stem for first limiting said independent movement, and subsequently effecting movement of said valve disk and valve stem as one unit.

8. In a valve; an elastic valve element movably mounted on a support consisting of a valve stem provided with stops which limit independent movement between said valve element and valve stem.

In testimony whereof I have hereunto affixed my signature.

CLARENCE B. HAYWARD.